Dec. 22, 1964  J. W. McENTIRE  3,162,412
CLAMPING STRUCTURE FOR CONTROL TUBING OR THE LIKE
Filed Aug. 6, 1962

INVENTOR.
JACK W. McENTIRE
BY
Lockwood, Woodard, Smith & Weikart
Attorneys

United States Patent Office 3,162,412
Patented Dec. 22, 1964

3,162,412
CLAMPING STRUCTURE FOR CONTROL TUBING OR THE LIKE
Jack W. McEntire, Ferguson, Mo., assignor to E & R Laboratory Service Corporation, St. Louis, Mo., a corporation of Missouri
Filed Aug. 6, 1962, Ser. No. 215,069
4 Claims. (Cl. 248—56)

This invention relates generally to clamping or supporting structures for control tubing, cables or the like and in particular to a grommet-like clamping structure for rigidly supporting tubes or cables or similar elements in their passage through apertures or lightening holes in aircraft, missiles or the like.

Particularly in aircraft and missile design, groups of control tubes, cables, electrical conductors and similar elements must be led through apertures in bulkheads and supported by properly positioned brackets at various points. Often it is desirable that the elements be supported in spaced relationship to each other and it is invariably desirable that no one element passing through the aperture or supported by a bracket be excessively stressed in compression or squeezed as can occur when the group of tubes or other elements are clamped together and supported en masse.

It is, therefore, the primary object of the present invention to provide a clamping or supporting structure of the type referred to above which can be economically manufactured and assembled conveniently at the point of use.

A further object of the present invention is to provide a structure which is self-anchoring in a bulkhead or bracket aperture and which limits the compressive or squeezing stress placed on any one of the tubes or other elements mounted by the structure.

These and other objects will become apparent as the description proceeds with reference to the accompanying drawings in which.

Figure 1:
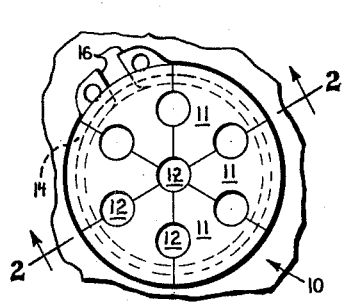
FIG. 1 is a side view of a structure embodying the present invention.
Figure 2:
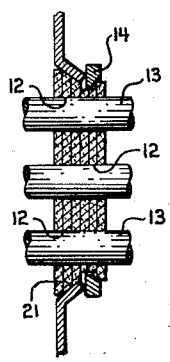
FIG. 2 is a side sectional view taken generally along the line 2—2 of FIG. 1.
Figure 3:
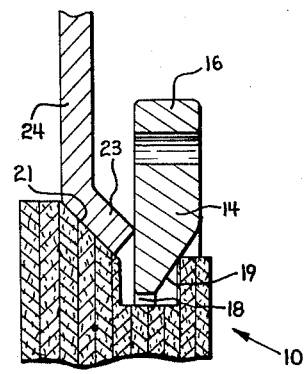
FIG. 3 is an enlarged sectional view showing the junction of the clamping structure and the bulkhead or bracket upon which it is mounted.

Referring initially to FIGS. 1, 2 and 3, the clamping structure of the present invention is comprised of a disc indicated generally at 10 formed of a plurality of circle sectors 11. The disc may be formed of any suitable material but is preferably machined from cloth impregnated, laminated phenolic block. The laminated block may be machined into disc form, provided with tube-receiving apertures to be subsequently described, and then cut into sectors 11.

The disc is provided with a plurality of tube or other control element receiving apertures 12, tubes 13 being shown schematically as supported within the apertures 12 in FIG. 2. The apertures 12 are disposed at the abutting margins of the sectors 11 so that each tube 13 extending through the apertures 12 is engaged by two sectors 11.

The disc formed by the sectors 11 is held in assembled relation by means of a snap ring 14 having apertured ends 16 as indicated in FIG. 1. The snap ring 14 fits within a continuous groove 18 (FIG. 3) formed in the circumferential margin of the disc. As will be evident from FIG. 3, the snap ring 14 has an inclined, inner marginal area 19 which engages the edge of the groove 18. The side of the groove 18 opposite the inclined portion 19 of the snap ring is formed so as to provide a bevelled wall 21 which terminates short of the base 22 of the groove. The marginal area 23 of the bulkhead or bracket 24 within which the clamping structure is mounted is preferably inclined or flanged so as to conform to the bevelled wall 21 of the groove, this inclined marginal area 23 of the bulkhead being accommodated between the inclined wall 21 of the groove and the adjacent side face of the clamp or locking ring 14. The clamp ring 14 is preferably formed of stainless steel and, since it is deformed slightly when in the position shown in FIG. 3, it exerts a radial compressive force on the sectors 11 thereby clamping the elements 13 within the apertures 12, the clamping or compressive force being of course limited by the engagement of the side margins of the sectors. The inclined marginal area or face 19 of the ring 14 also serves to wedge or lock the marginal area 23 of the bulkhead or bracket against the bevelled wall 21 of the groove 18. The ring 14 thus serves both to exert a radial compressive force clamping the elements 13 within the apertures 12 and also provides a clamping force which serves to anchor the disc 10 upon the supporting bracket or bulkhead 24.

Figure 4:
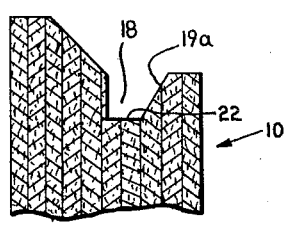
FIG. 4 is an enlarged sectional view of a portion of the structure indicating a modified form for the circumferential groove.

Referring to FIG. 4, there is shown a modified form of the groove 18 in the circumferential area of the disc 10. This form of the groove differs from that described with reference to FIG. 3 in that the groove 18 is provided with a bevelled wall 19a which extends to the base 22 of the groove. This form of groove provides a greater area of contact between the groove wall and the adjacent face of the locking ring and also provides the sideward clamping force component (for locking the disc to the bulkhead) when a clamping ring having a straight rather than a bevelled side face is utilized.

Figure 5:
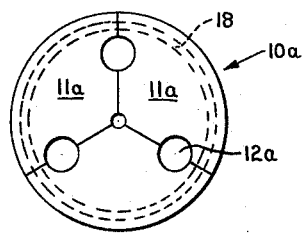
FIG. 5 is a view similar to FIG. 1 but illustrating a modified form of the structure.

While the structure described with reference to FIGS. 1 and 2 has seven element receiving apertures therein, it will be evident that any number of apertures might be utilized depending upon the size of the apertures. In FIG. 5 a disc 10a is illustrated having but three element receiving apertures 12a. In such modified structure the arrangement of the groove 18 and the locking ring is identical to that previously described, however, the number of sectors 11a is of course reduced as compared to the structure of FIG. 1.

Figure 6:
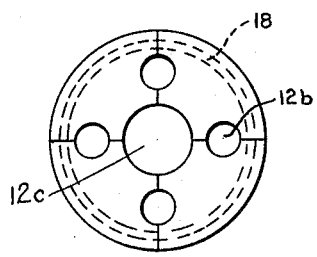
FIG. 6 is a view similar to FIG. 1 but illustrating a further modified form of the structure.

FIG. 6 illustrates a further modified form of the disc in which the apertures 12b and 12c are not necessarily of identical diameter. In the structure of FIG. 6, again, the circumferential groove 18 and the locking ring arrangement are identical to that described with reference to FIGS. 1–3.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A clamping structure for supporting elements such as tubing and adapted to be mounted within an aperture in a bulkhead, bracket or other supporting surface, said clamping structure comprising a disc formed from a plurality of circle sectors, a plurality of element receiving apertures through said disc disposed at the abutting margins of said sectors, the circumferential margin of said disc having a continuous groove therein, said groove having a bevelled wall terminating short of the base of the groove, and a clamp ring having an inclined marginal area extending within the groove exerting a radial compressive force on said sectors to clamp the elements within said apertures, and to lock said bevelled groove wall against the supporting surface.

2. A clamping structure for supporting elements such as tubing and adapted to be mounted within an aperture in a bulkhead, bracket or other supporting surface, said clamping structure comprising a disc formed from a plurality of circle sectors, at least one element receiving aperture through said disc disposed at one of the abutting margins of said sectors, the circumferential margin of said disc having a continuous groove therein, said groove having a bevelled wall terminating short of the base of the groove, and a clamp ring having an inclined marginal area extending within the groove exerting a radial compressive force on said sectors to clamp the element within said aperture, and to lock said bevelled groove wall against the supporting surface.

3. A clamping structure for supporting elements such as tubing and adapted to be mounted within an aperture in a bulkhead, bracket or other supporting surface, said clamping structure comprising a disc formed from a plurality of circle sectors, at least one element receiving aperture through said disc disposed at one of the abutting margins of said sectors, the circumferential margin of said disc having a continuous groove therein, and a clamp ring extending within the groove exerting a radial compressive force on said sectors to clamp the element within said aperture, said groove and said clamp ring having cooperating surfaces functioning to lock said disc within the said supporting surface aperture.

4. A clamping structure for supporting elements such as tubing and adapted to be mounted within an aperture in a bulkhead, bracket or other supporting surface, said clamping structure comprising a disc formed from a plurality of circle sectors, at least one element receiving aperture through said disc disposed at one of the abutting margins of said sectors, the circumferential margin of said disc having a continuous groove therein, and a clamp ring having an inclined marginal area extending within the groove exerting a radial compressive force on said sectors to clamp the element within said aperture, and to lock said bevelled groove wall against the supporting surface.

References Cited in the file of this patent
UNITED STATES PATENTS

| | | |
|---|---|---|
| 1,794,476 | Taylor | Mar. 3, 1931 |
| 1,851,940 | Williams | Mar. 29, 1932 |
| 2,037,536 | Richardson | Apr. 14, 1936 |
| 2,181,664 | Melzer | Nov. 28, 1939 |
| 2,365,785 | Tinnerman | Dec. 26, 1944 |
| 2,517,717 | Rose | Aug. 8, 1950 |
| 2,813,692 | Bremer et al. | Nov. 19, 1957 |
| 2,939,727 | Allen et al. | June 7, 1960 |
| 3,080,180 | Rector | Mar. 5, 1963 |